United States Patent [19]

Leonard et al.

[11] Patent Number: 4,655,175
[45] Date of Patent: Apr. 7, 1987

[54] STEAM PURGE OF A PISTON/CYLINDER GAP IN A DIESEL ENGINE

[75] Inventors: Gary L. Leonard, Sitterly Rd., Apt. 89C, Clifton Park, N.Y. 12065; Sanjay M. Carrea, 1091 Mohawk Rd., Schenectady, both of N.Y. 12309

[73] Assignee: General Electric Company, Schenectady, N.Y.

[21] Appl. No.: 822,500

[22] Filed: Jan. 27, 1986

[51] Int. Cl.⁴ .................................................. F02M 25/02
[52] U.S. Cl. .................. 123/25 C; 123/25 P; 123/193 P
[58] Field of Search ................. 123/25 C, 25 D, 25 P, 123/193 P

[56] References Cited

U.S. PATENT DOCUMENTS

| 343,745 | 6/1886 | Wilcox | 123/25 C |
| 795,422 | 7/1905 | Thomson | 123/25 C |
| 810,535 | 1/1906 | Heinrich | 123/25 C |
| 1,371,543 | 3/1921 | Becker | 123/25 C |
| 1,432,799 | 10/1922 | Stackhouse | 123/193 P |
| 1,953,109 | 4/1934 | Heron | 123/193 P |
| 4,122,803 | 10/1978 | Miller | 123/25 C |
| 4,281,626 | 8/1981 | Fishe | 123/25 P |
| 4,282,837 | 8/1981 | Holtman et al. | 123/193 |
| 4,402,182 | 9/1983 | Miller | 123/25 C |

FOREIGN PATENT DOCUMENTS 280472  9/1913  Fed. Rep. of Germany ... 123/25 D

Primary Examiner—Ira S. Lazarus
Attorney, Agent, or Firm—William H. Steinberg; James C. Davis, Jr.; Paul R. Webb, II

[57] ABSTRACT

An improvement for a diesel engine uses a vapor to purge a gap between a piston and cylinder wall. The diesel engine includes at least one cylinder, a piston reciprocatingly mounted in the cylinder, and means for establishing a compression seal between the piston sidewall surface and cylinder wall surface. A chamber is disposed in the piston crown. Means are provided for conducting a liquid into the chamber and containing the liquid under pressure in the chamber. Further provided are means situated in the piston sidewall surface for conducting a vapor between the chamber and the gap between the piston and cylinder wall. In operation, a liquid such as water is conducted into the chamber disposed in the piston crown. The heat generated in the cylinder during the normal operation of the engine is absorbed through the piston crown by the liquid in the chamber. The liquid subsequently turns to a vapor and, being contained in the chamber under pressure, seeps through the vapor conducting means to purge the gap between the piston and cylinder wall.

17 Claims, 4 Drawing Figures

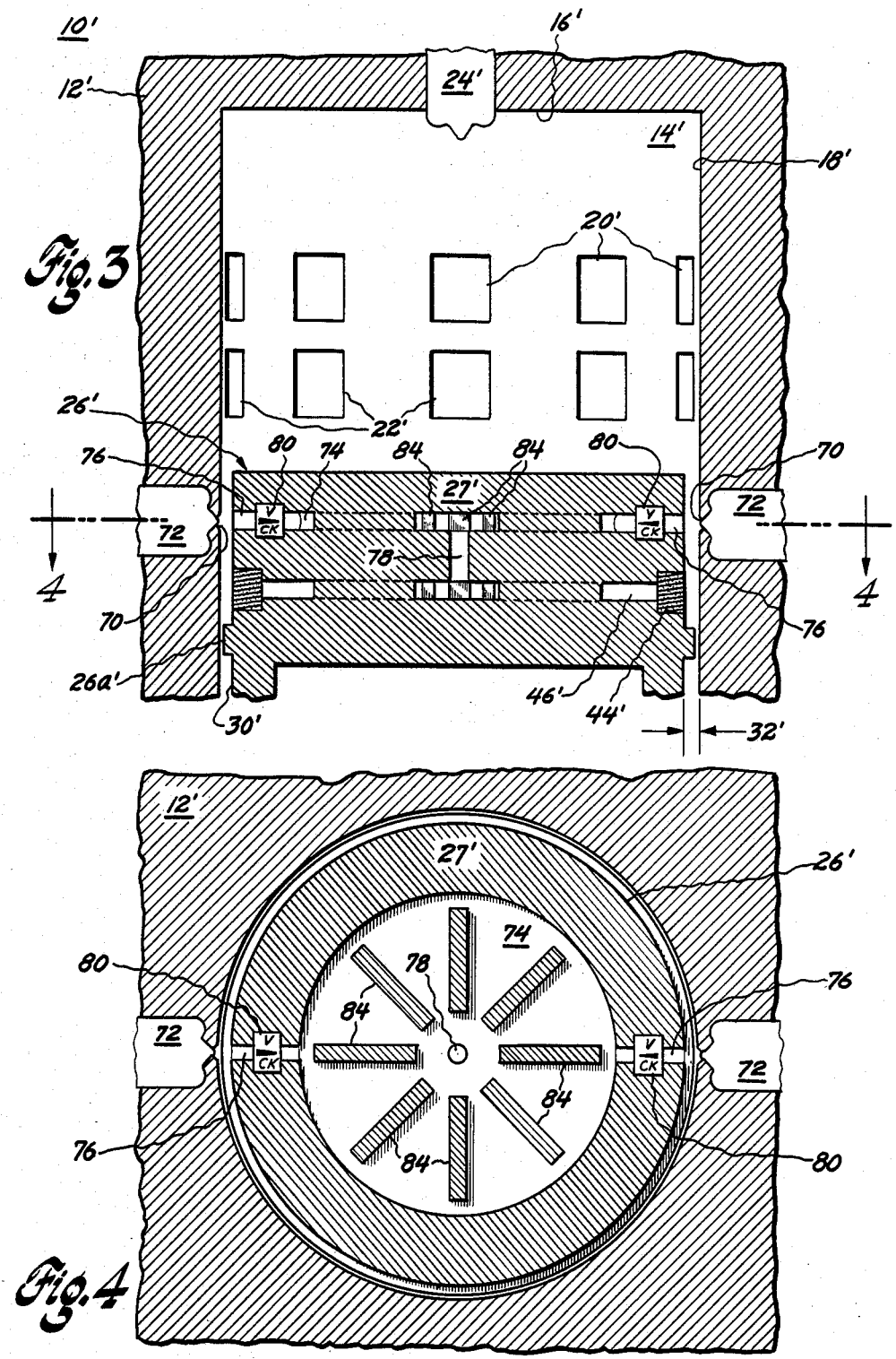

STEAM PURGE OF A PISTON/CYLINDER GAP IN A DIESEL ENGINE

The present invention relates in general to internal combustion engines and more specifically to an improvement for a diesel engine wherein a vapor is used to purge a gap between a piston sidewall surface and a cylinder wall surface.

BACKGROUND OF THE INVENTION

In operation, both two and four-stroke cycle diesel engines generate what is known in the art as "blow-by gases", or combustion gases which during the compression and firing strokes of a piston blow past compression ring seals surrounding the piston, and subsequently down between a cylinder wall surface and a piston sidewall surface. In diesel engines powered by fuels containing abrasive particles, for example a coal-water slurry fuel, these blow-by gases contain abrasive particulate matter (for example, ashes).

When this abrasive particulate matter enters between the piston sidewall surface and the cylinder wall surface (or liner), it causes excessive wear of these surfaces and also of the compression ring seals. This excessive wear eventually causes premature failure of the diesel engine. Accordingly, it would be desirable to provide an improvement for diesel engines whereby dirt contained in the combustion gases is both prevented from entering and purged from between the piston sidewall surface and cylinder wall surface.

OBJECTS OF THE INVENTION

A principal object of the present invention is to provide an improvement for a diesel engine whereby abrasive and corrosive particulate matter is purged from the gap between a piston and cylinder wall, thereby providing the diesel engine with increased longevity and reliability.

Another object of the present invention is to provide an improvement for a diesel engine whereby a vapor is used to purge the gap between a piston and cylinder wall.

A more specific object of the present invention is to provide an improvement for slurry-burning diesel engines whereby a vapor is used both to prevent particulate matter in the combustion gases from penetrating into the gap between the piston and cylinder wall, and to purge any abrasive and corrosive particulate matter situated within that gap.

SUMMARY OF THE INVENTION

An improvement for a diesel engine is provided whereby a vapor is used to purge a gap between a piston and cylinder wall, the vapor operating both to prevent particulate matter in the combustion gases from penetrating into the gap, and also to purge any corrosive or abrasive particulate matter already situated therein. The invention is implemented in either a two or four-stroke cycle diesel engine including at least one cylinder, a piston reciprocatingly mounted in the cylinder, and means for establishing a compression seal between the piston sidewall surface and cylinder wall surface.

In accordance with the present invention, a chamber is disposed in the piston crown. Means are provided for conducting a liquid into the chamber and containing the liquid under pressure in the chamber. Further provided are means situated in the piston sidewall surface for conducting a vapor between the chamber and the gap between the piston and cylinder wall. In operation, a liquid such as water is conducted into the chamber in the piston crown. The heat generated in the cylinder during normal engine operation is absorbed through the piston crown by the liquid in the chamber. The liquid subsequently turns to a vapor and, being contained in the chamber under pressure, seeps through the vapor conducting means to purge the gap between the piston and cylinder wall.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing Figures, in which:

FIG. 3 illustrates a cross-sectional front view of a portion of a two-stroke diesel engine constructed in accordance with a second embodiment of the present invention; and FIG. 4 illustrates a sectional view taken along line 4—4 of FIG. 3.

PREFERRED EMBODIMENTS OF THE INVENTION

Figure 1:
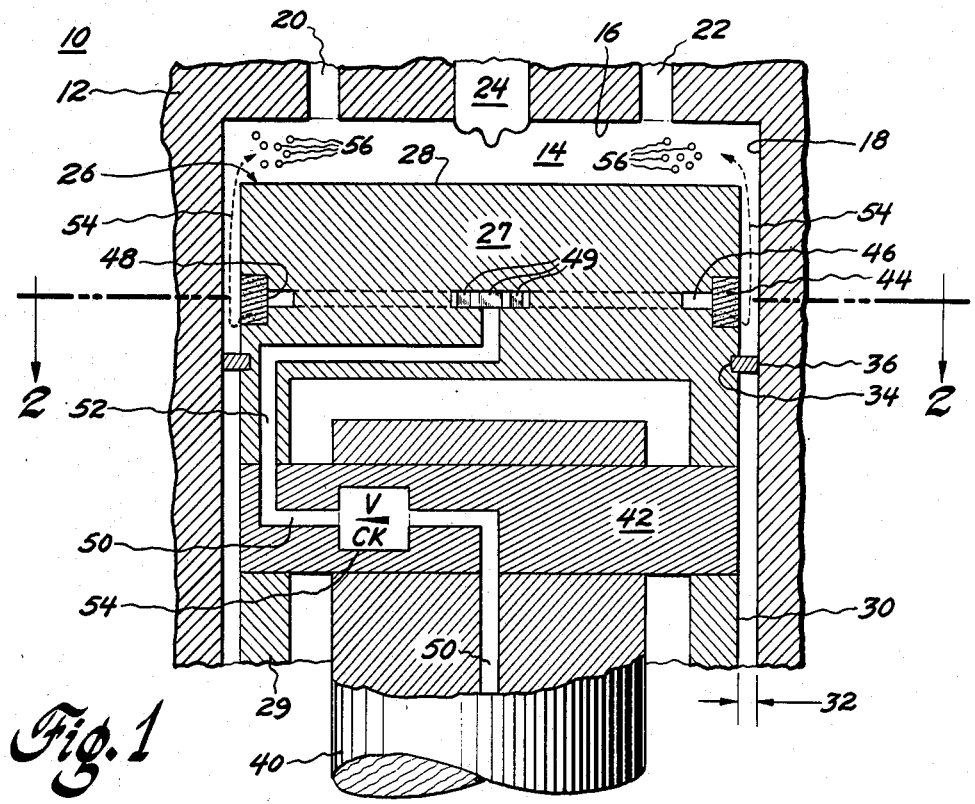
FIG. 1 illustrates a cross-sectional front view of a portion of a four-stroke diesel engine constructed in accordance with a first embodiment of the present invention.
Figure 2:
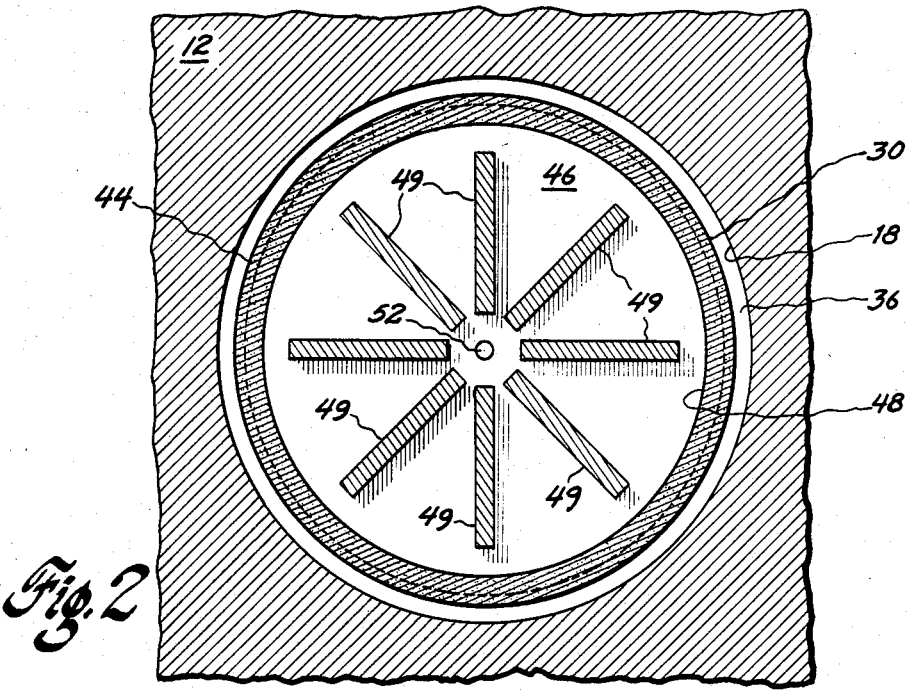
FIG. 2 illustrates a sectional view taken along line 2—2 of FIG. 1.

Referring now to FIGS. 1 and 2, a portion 10 of a diesel engine (not shown in its entirety) includes a block 12, for example comprising iron or steel, and defining a cylinder 14 including a head surface 16 and a circumferential wall surface or liner 18. Combustion air and exhaust gas ports, indicated at 20 and 22, respectively, communicate through cylinder head surface 16 with cylinder 14. Means for injecting fuel into cylinder 14, for example an injector as shown schematically at 24, extends through cylinder head surface 16 and into the cylinder. A piston 26 is slidingly disposed in cylinder 14 and includes a crown portion 27 having a surface 28 adjacent cylinder head surface 16, and a skirt 29 having a circumferential sidewall surface 30 spaced from cylinder wall 18 by a clearance gap 32 of a predetermined distance. Piston 26 is adapted for reciprocating motion between a top-dead-center (TDC) stroke position wherein piston crown surface 28 and cylinder head surface 16 are at their closest relative distance (FIG. 1), and a bottom-dead-center (BDC) stroke position wherein the piston crown surface and the cylinder head surface are at their furthest relative distance (FIG. 3). Further illustrated in FIG. 1 is means for establishing a compression seal between cylinder wall surface 18 and piston sidewall surface 30, shown in this embodiment as an annular groove 34 and a split, cast-iron compression ring seal 36 disposed therein. A connecting rod 40 is fastened to piston skirt 29 by a connecting pin 42 for connecting piston 26 to a crankshaft (not shown).

In accordance with this first embodiment of the present invention, a porous ring 44, for example comprising sintered stainless-steel, is inlaid in surface 30 of piston 26. A generally cylindrical chamber 46 is disposed in piston crown 27 and communicates with ring 44 at its adjoining circumferential edge 48. Chamber 46 further includes 8 radially extending supports 49 for reinforcing piston crown 27. Means for conducting a liquid, for example water (not shown), into chamber 46 and containing the liquid in the chamber under pressure includes a passageway 50 extending through connecting rod 40 and pin 42 for conveying the liquid to piston crown 27, a passageway 52 extending through the piston crown and skirt 29 in series with passageway 50, and a check-valve 54 disposed in pin 42 in series with passageways 50 and 52.

In operation, water is conducted via passageways 50, 52 and check-valve 54 into chamber 46. The heat generated in cylinder 14 during the normal operation of the diesel engine is absorbed in piston crown 27 and subsequently causes the water in chamber 46 to vaporize. Because check-valve 54 prevents the steam from escaping back through passageways 50 and 52, the steam seeps through porous ring 44 and into clearance gap 32 along the paths indicated by arrows 54. This steam prevents any dirt or particulate material, shown for example at 56, from entering into clearance gap 32 and abrading the piston sidewall or cylinder wall surfaces, 30 and 18, respectively.

In order to keep gap 32 purged of particulate matter in the combustion gases, steam should be forced through sintered ring 44 during both firing of the cylinder and exhaustion of the combustion gases. In this mode of operation the steam will act to prevent the particulate matter from entering into the gap. However, steam forced into the gap at other times in the engine cycle will also act to purge already deposited particulate matter from gap 32. Thus, water can be conducted into chamber 46 during any cycle of the engine, in a pulsed or continuous stream, so long as sufficient steam is generated to purge gap 32. One sample mode of operation applicable to a four-stroke engine would be to pump water under pressure into chamber 46 from the beginning of each firing stroke to the beginning of the next induction stroke. This would insure sufficient steam to purge gap 32 during both the firing and exhaust strokes. However, it will be appreciated by those skilled in the art that this represents only one exemplary mode of operation, and any mode which generates enough steam to purge gap 32 of combustion contaminants would be appropriate.

FIGS. 3 and 4 illustrate a second embodiment of the present invention including a portion 10' of a diesel engine substantially identical in structure to portion 10 of FIGS. 1 and 2, with the exception of the structure of the means for conducting water into chamber 46', and the means for establishing a compression seal between piston sidewall surface 30' and cylinder wall surface 18'. Like features are indicate by like, primed reference numerals. In accordance with this embodiment of the invention, means for conducting water into chamber 46' and containing the water under pressure includes two fluid apertures 70, each communicating through cylinder wall surface 18' with cylinder 14'. Means for injecting water into cylinder 14', for example an injector 72 shown schematically in FIG. 3, is disposed in each fluid aperture 70. The water-conducting means further includes a generally cylindrical chamber 74 disposed in piston crown 27'. Chamber 74 communicates with cylinder 14 via two ports 76 disposed on piston sidewall surface 30', and with chamber 46' via a passageway 78 disposed in piston crown 27'. Fluid apertures 70 are spaced from cylinder head surface 16' such that when piston 26' is at BDC (as shown in FIG. 3), apertures 70 are substantially aligned with ports 76. A check-valve 80, preferably comprising a flap valve, is disposed in series with each port 76. As shown in FIG. 4, chamber 74 includes eight radially extending supports 84 for reinforcing piston crown 27'. For purposes of explanation, this second embodiment of the invention is shown implemented in a two-stroke cycle diesel engine wherein the combustion air and exhaust gas ports, 20' and 22', respectively, each comprise a plurality of circumferentially disposed ports on piston wall surface 18'. Further, in this embodiment of the invention, the compression seal between piston sidewall surface 30' and cylinder wall surface 18' is illustrated as being established by a metal flange extension 26a' of piston 26'. Piston 26' thus forms a close metal fit with cylinder sidewall surface 18'. It will be appreciated by those skilled in the art that the features shown in both embodiments of the invention illustrated herein (i.e. the first embodiment shown in FIGS. 1 and 2, and the second embodiment shown in FIGS. 3 and 4) can be implemented in either two or four-stroke cycle diesel engines, the only differences therebetween being the well known differences in the intake and exhaust processes of the engines.

The operation of this second embodiment of the invention is substantially identical to that of the first embodiment described hereinabove, with the exception of the conduction of the water into chambers 74 and 46'. In this second embodiment, water is injected through fluid apertures 70 via injectors 72 when piston 26' is at BDC (FIG. 3). Because fluid port 76 is substantially aligned with fluid aperture 70 at BDC, this injected water is conducted into the fluid port, through check valve 80, and subsequently into chambers 74 and 46' and passageway 78. When piston 26' moves to TDC, the water in chambers 74 and 46' and passageway 78 is vaporized to steam, this steam subsequently seeping through ring 44' and purging gap 32' in the manner described above.

In summary, an improvement to a diesel engine is provided wherein a vapor is used to purge the gap between the piston sidewall and cylinder wall surfaces. This vapor purging prevents dirt and particulate matter in the cylinder from entering into or accumulating in this gap, thus preventing abrading of the cylinder, piston and compression ring seal. The improvement can be implemented in both two and four-stroke cycle diesel engines.

While preferred embodiments of the invention have been illustrated and described, it will be clear that the invention is not so limited. Numerous modifications, changes, variations, substitutions and equivalents will occur to those skilled in the art without departing from the spirit and scope of the present invention. For example, while water has been described as the liquid, and hence steam as the purging vapor, it will be apparent to those skilled in the art that other liquids can be substituted therefor, the important characteristics of the liquid being the boiling point and purging qualities. For example, alcohol could be substituted for the water described herein. Further, while a porous metal ring such as sintered stainless steel has been shown for conducting the steam into the cylinder, other materials, for example a sintered ceramic, can be substituted therefor. Accordingly, it is intended that the invention herein be limited only by the scope of the appended claims.

What is claimed is:

1. In an internal combustion engine comprising a block defining at least one cylinder including a head surface and a wall surface; a piston slidingly mounted in said cylinder including a crown having a crown surface adjacent said cylinder head surface and a sidewall surface spaced from said cylinder wall surface by a gap; sealing means circumferentially surrounding said piston sidewall surface and spaced from said crown surface for establishing a compression seal between said piston and said cylinder; the combination of:

said piston crown further defining a first chamber;

means situated in said piston sidewall surface between said sealing means and said piston crown surface for conducting a vapor between said first chamber and said gap;

means for conducting a liquid into said first chamber and containing said liquid under pressure in said first chamber such that said liquid is vaporized by the heat in said cylinder and said vapor seeps through said vapor conducting means and purges said gap between said piston sidewall surface and cylinder wall surface.

2. The combination of claim 1 wherein said vapor conducting means comprises a porous ring inlaid in said piston sidewall surface and disposed in communication with said first chamber.

3. The combination of claim 2 wherein said liquid conducting means comprises:

means for conveying said liquid to said piston crown;

said piston further defining a passageway between said liquid conveying means and said first chamber; and a valve disposed in series with said passageway for containing said liquid in said first chamber under pressure.

4. The combination of claim 3 wherein said liquid comprises water or alcohol.

5. The combination of claim 3 wherein said porous ring comprises sintered stainless steel or a sintered ceramic material.

6. The combination of claim 3 wherein said liquid conveying means comprises:

a connecting rod for connecting said piston to a crankshaft; and a pin for fastening said connecting rod to said piston; said connecting rod and said pin together defining a passageway for conducting said liquid to said piston crown.

7. The combination of claim 3 wherein said first chamber comprises:

a generally cylindrical void disposed in said piston crown, the edge of said void adjoining said porous metal ring; and a plurality of generally radially extending supports disposed in said void for reinforcing said piston crown.

8. The combination of claim 3 wherein said internal combustion engine comprises a two-stroke diesel engine.

9. The combination of claim 3 wherein said internal combustion engine comprises a four-stroke diesel engine.

10. The combination of claim 2 wherein said piston is adapted for reciprocating motion in said cylinder between a bottom-dead-center stroke position whereat said piston crown surface and cylinder head surface are at their furthest relative distance and a top-dead-center stroke position whereat said piston crown surface and said cylinder head surface are at their closest relative distance; said liquid conducting means including:

said block further defining at least one fluid aperture in said cylinder wall surface for conducting said liquid into said cylinder;

said piston crown further defining a second chamber communicating between said first chamber and a fluid port disposed on said piston sidewall surface;

a valve disposed in series with said fluid port for containing said liquid in said first and second chambers under pressure; and said fluid aperture spaced from said cylinder head surface so that said fluid aperture and said fluid port are in substantial alignment when said cylinder is proximate said bottom-dead-center stroke position, whereby said liquid is conducted via said fluid aperture through said fluid port, past said valve and into said first and second chambers.

11. The combination of claim 10 wherein said liquid comprises water or alcohol.

12. The combination of claim 10 wherein said porous metal ring comprises sintered stainless steel or a sintered ceramic material.

13. The combination of claim 10 wherein said fluid port is disposed between said sealing means and said piston crown surface.

14. The combination of claim 10 wherein said first chamber comprises:

a generally cylindrical void disposed in said piston crown, the edge of said void adjoining said porous metal ring; and a plurality of generally radially extending supports disposed in said void for reinforcing said piston crown.

15. The combination of claim 10 wherein said second chamber comprises:

a generally cylindrical void disposed in said piston crown, the edge of said void adjoining said fluid port; and a plurality of generally radially extending supports disposed in said void for reinforcing said piston crown.

16. The combination of claim 10 wherein said internal combustion engine comprises a two-stroke diesel engine.

17. The combination of claim 10 wherein said internal combustion engine comprises a four-stroke diesel engine.

* * * * *

UNITED STATES PATENT AND TRADEMARK OFFICE
CERTIFICATE OF CORRECTION

PATENT NO. : 4,655,175
DATED : April 7, 1987
INVENTOR(S) : Gary L. Leonard and Sanjay M. Correa It is certified that error appears in the above-identified patent and that said Letters Patent is hereby corrected as shown below:

In the heading inventor's name reading "Sanjay M. Carrea" should read --Sanjay M. Correa--.

Signed and Sealed this

Eleventh Day of August, 1987

*Attest:*

DONALD J. QUIGG

*Attesting Officer*   *Commissioner of Patents and Trademarks*